(12) United States Patent
Keller et al.

(10) Patent No.: US 6,271,320 B1
(45) Date of Patent: Aug. 7, 2001

(54) METHOD FOR THE PRODUCTION OF A POLYMER DISPERSION BY RADICAL AQUEOUS EMULSION POLYMERIZATION WITH A CONTINUOUSLY PRODUCED AQUEOUS MONOMER EMULSION

(75) Inventors: Andreas Keller, Böhl-Iggelheim; Sven Lawrenz, Mannheim; Gerhard Bauer, Weinheim; Jürgen Schmidt-Thümmes, Neuhofen; Reinhard Bächer, Bad Dürkheim; Jürgen Hartmann, Frankenthal; Chung-Ji Tschang, Bad Dürkheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/308,231

(22) PCT Filed: Nov. 21, 1997

(86) PCT No.: PCT/EP97/06511

§ 371 Date: May 20, 1999

§ 102(e) Date: May 20, 1999

(87) PCT Pub. No.: WO98/23650

PCT Pub. Date: Jun. 4, 1998

(30) Foreign Application Priority Data

Nov. 25, 1996 (DE) .............................. 196 48 744

(51) Int. Cl.$^7$ ...................................................... C08F 2/08
(52) U.S. Cl. ................................ 526/88; 526/62; 526/64; 526/79; 526/80; 526/78; 526/329.1; 526/392.2

(58) Field of Search ................................. 526/62, 64, 79, 526/80, 329.1, 329.2, 88, 78

(56) References Cited

U.S. PATENT DOCUMENTS

| 3,637,563 | 1/1972 | Christena . |
| 4,371,659 | 2/1983 | Druschke et al. . |
| 4,713,434 | * 12/1987 | Sutterlin et al. ..................... 526/62 |
| 5,250,576 | * 10/1993 | DesMarais et al. .................... 521/63 |
| 5,648,420 | 7/1997 | Fujiwara et al. . |
| 5,656,689 | 8/1997 | Fujiwara et al. . |
| 5,703,157 | 12/1997 | Fujiwara et al. . |

FOREIGN PATENT DOCUMENTS

| 0 037 923 | 10/1981 | (EP) . |
| 0 575 625 | 12/1993 | (EP) . |

OTHER PUBLICATIONS

Kirk–Othmer, Encyclopedia of Chem. Technol., vol. 1, 3$^{rd}$ Edition, pp. 397–400, "Acrylic Ester Polymers".
Kirk–Othmer, Encyclopedia of Chem. Technol., vol. 14, 3$^{rd}$ Edition, pp. 82–92, "Latex Technology".
Encyclopedia of Polymer Sci and Engng., vol. 6, pp. 10–20, "Emulsion Polymerization", 1986.

* cited by examiner

*Primary Examiner*—David W. Wu
*Assistant Examiner*—William K. Cheung
(74) *Attorney, Agent, or Firm*—Oblon, Spivak, McClelland, Maier & Neustadt, P.C.

(57) ABSTRACT

A polymer dispersion is prepared by free radical polymerization of an aqueous monomer emulsion by a process in which the monomer emulsion is prepared continuously at the rate of consumption.

20 Claims, No Drawings

METHOD FOR THE PRODUCTION OF A POLYMER DISPERSION BY RADICAL AQUEOUS EMULSION POLYMERIZATION WITH A CONTINUOUSLY PRODUCED AQUEOUS MONOMER EMULSION

The present invention relates to a process for the preparation of a polymer dispersion by free radical polymerization of an aqueous monomer emulsion.

In the preparation of polymer dispersions by emulsion polymerization, the distinction is generally made between batch, semibatch and continuous processes, various methods for the addition of monomers to the reaction containers being described.

Kirk-Othmer, Encyclopedia of Chemical Technology, 3rd Edition, Vol. 1, page 397 et seq. describes a semibatch process for emulsion polymerization, taking the large-scale industrial polymerization of acrylates as an example. A monomer emulsion prepared in a separate kettle is introduced continuously into the polymerization reactor, mixed there with an aqueous initiator solution and polymerised.

Kirk-Othmer, Encyclopedia of Chemical Technology, 3rd Edition, Vol. 14, page 92 et seq. gives a comparative overview of batch, semibatch and continuous processes for emulsion polymerization. In a general procedure for a semibatch process, the emulsion feed may contain all ingredients used for the emulsion polymerization, for example monomers, surfactants, water and regulator, the monomer emulsion being prepared in a separate kettle, ie. the feed tank. Here, however, the initiator may not be mixed into the monomer emulsion since polymerization could then take place in the feed tank.

Encyclopedia of Polymer Science and Engineering, Vol. 6, page 10 et seq. (1986) likewise describes batch, semibatch and continuous reactors for emulsion polymerization. As above, the preparation of a monomer emulsion in a separate kettle is described as a possible variant of the batch and semibatch process, which emulsion-may contain all emulsion components with the exception of the initiator. This is added directly to the polymerization reactor in a separate feed. In the continuous processes described, the monomers, either without prior emulsification together with the aqueous phase or in the form of a monoemulsion which is prepared separately and stored, are fed continuously to the reactor or reactors.

Semibatch processes in which a continuous feed is introduced into a stirred reactor but no product is removed during the reaction are preferable to the batch processes. Thus, the composition of the feed and the first filling can be varied in a simple manner and a large number of different dispersions can therefore be prepared in one and the same reactor. In addition to these advantages, further benefits of the semibatch process are its greater safety owing to the smaller amounts of monomers in the reactor compared with the batch process and better removal of the heat of reaction, in particular in the case of dispersions in which there is a sharp increase in viscosity during the polymerization. Furthermore, the possible regulation of the feed rates of the monomers or of the monomer emulsion and hence improved control of the reaction are advantageous.

In the semibatch process, the monomers can be fed into the polymerization reactor, for example, separately from the initiator feed in pure form as a single feed, as described, for example, in EP-A-0 575 625. Further methods for adding the monomers to the polymerization reactor are, as also described above, the addition together with the aqueous phase without prior emulsification and the addition of a monomer emulsion prepared in a separate kettle.

Prior art processes with the addition of the monomers in nonemulsified or pure form have the following disadvantages:

a) The energy required for emulsifying the monomers must be applied by the stirrer of the polymerization reactor. This requires either the use of special, expensive stirrers, some of which are complicated and difficult to clean, or an increase in the power supply to the reaction material by increasing the stirrer speed or using larger stirrers. The latter measures lead to increased shearing of the dispersions and hence to greater coagulum formation.

b) In the case of insufficient emulsification in the reactor, a pure monomer phase may form in the reactor, ie. the specifically lighter monomer which has not yet reacted forms a cohesive layer floating on the remaining reaction material. After the end of the emulsion feed, there is no cooling effect of the cold feeds and there may be a sharp temperature increase in the interior of the kettle as a result of the reaction of this concentrated monomer phase. Moreover, the reaction of such a concentrated monomer phase leads to increased coagulum formation and to severe contamination of the reactor.

The prior art semibatch processes described above, in which a monomer emulsion is fed continuously to the polymerization reaction, all require the preparation and provision of this emulsion in a separate kettle before the beginning of the reaction. However, this process variant has the following disadvantages:

a) The initiator cannot be mixed into the monomer emulsion since polymerization in the feed vessel is then to be expected. However, separate initiator feed into the reactor results in a locally increased electrolyte concentration at the feed point, which leads to a higher level of undesirable coagulum formation.

b) The emulsions used for the aqueous free radical emulsion polymerization are thermodynamically unstable, ie. separation of the monomer emulsion as a result of coalescence of the monomer droplets may occur and a monomer phase may form in the feed vessel. At the same time, emulsifier is released and forms micelles in the reactor and may thus initiate the growth of a further undesirable particle generation. Moreover, the introduction of a formed pure monomer phase at the end of the feed give rise to the problems described above, resulting from a sharp temperature increase, increased coagulum formation and contamination of the reactor.

c) In the preparation of more highly concentrated dispersions, the monomer emulsion fed to the polymerization reactor must have a high monomer content. This leads in general to emulsions having a high viscosity and hence to problems with the conveying of these emulsions. Furthermore, particularly highly concentrated aqueous monomer emulsions tend to separate.

None of the abovementioned publications indicates the use of a continuously prepared aqueous monomer emulsion in the free radical aqueous emulsion polymerization for the preparation of polymer dispersions.

U.S. Pat. No. 5,250,576 describes a continuous process for the preparation of a special water-in-oil emulsion (high internal phase emulsion HIPE) having a high content of disperse aqueous phase and its subsequent polymerization and the dewatering for the preparation of absorber foams. The process comprises:

a) preparation of an oil phase from monomers, such as styrene and p-methylstyrene, comonomers, eg. alkyl acrylates and alkyl methacrylates, butadiene, etc., crosslinking agents and emulsifiers;

b) preparation of an aqueous phase from a water-soluble electrolyte and a water-soluble initiator;

c) simultaneous introduction of oil phase and water phase into a dynamic mixing zone;

d) preemulsification;

e) HIPE formation in the dynamic mixing zone by increasing the flow rate of the aqueous phase and/or reducing the flow rate of the oil phase;

f) continuous conveying from the dynamic into a static mixing zone through which the mixture flows, a stable water-in-oil emulsion being formed;

g) polymerization and dewatering.

In contrast to the free radical aqueous emulsion polymerization in which the polymerization takes place in the micells and not in the monomer droplets (oil phase), in this process the polymerization takes place in the oil phase so that it may be considered as a special case of mass polymerization. Furthermore, the process is not intended for the preparation of a stable aqueous polymer dispersion but serves for the preparation of a polymer foam which can be dewatered to give an absorber. Accordingly, the problems described above, which are specific to the preparation of aqueous polymer dispersions, for example coagulum formation, play no role in the process of U.S. Pat. No. 5,250,576.

It is an object of the present invention to provide a process for the preparation of, preferably, highly concentrated polymer dispersions by free radical polymerization of an aqueous monomer emulsion, the disadvantages described above, in particular the increased coagulum formation, the contamination of the polymerization kettle and a temperature increase shortly before or after the end of the monomer addition, being avoided.

We have found, surprisingly, that this object is achieved by a process for the preparation of an aqueous polymer dispersion, wherein an aqueous monomer emulsion prepared continuously at the rate at which it is consumed is fed to the reaction vessel.

The present invention therefore relates to a process for the preparation of a polymer dispersion by free radical polymerization of an aqueous monomer emulsion, wherein the monomer emulsion is prepared continuously at the rate of consumption. According to the invention, the components of the monomer emulsion are mixed in at least one mixing apparatus to give the emulsion.

The novel process is suitable for the preparation of homopolymers and copolymers so that, for the continuous preparation of the monomer emulsion in the mixing apparatus, at least one monomer-containing feed is introduced into said apparatus. A plurality of monomers may be added separately or as mixtures, which can be produced, for example, by combining the individual feeds in a common pipeline.

The monomers may be fed to the mixing apparatus in pure form (oil phase) or together with water. A surfactant (emulsifier) is preferably added to water-containing monomer feeds before entry into the mixing apparatus for the preparation of the monomer emulsion.

The initiator is added via a separate feed, in general in aqueous phase, but the monomer feed and initiator feed may be combined before entry into the mixing apparatus. If desired, the initiator may also be added directly to the reactor, independently of the monomer emulsion.

Depending on the compatibility, the other components of the monomer emulsion, which are defined more exactly below, are added together with one of the abovementioned feeds or separately in pure form, as a solution in water or in a suitable solvent.

When carrying out the novel process as semibatch process, a part of the aqueous phase and, if required, one or more of the monomers and/or the other components of the monomer emulsion are preferably initially taken in the reactor.

Feeding of the components into the mixing apparatus may be carried out by conventional methods. These include, for example, the direct addition of all components or the formation of suitable premixes.

In a suitable embodiment of the novel process for the preparation of copolymers, for example, a mixture of one or more water-soluble monomers, an emulsifier and, if required, further additives as the first feed may be combined with an aqueous solution of an initiator as the second feed, for example in a common pipeline section. For example, at least one water-insoluble monomer in pure form (oil phase) may then be added as a third feed to this mixture, if required by means of a metering apparatus. The mixture of the three feeds is emulsified continuously at the rate of consumption in a mixing apparatus as described in detail below and is fed directly to the reaction vessel.

In the novel process, one or more mixers may be used as the mixing apparatus in the continuous preparation of the aqueous monomer emulsion, and these may be mixers of identical or different design, which are used in any desired sequence, arrangement and combination, for example an arrangement of all mixers in series, a combination of a parallel and series arrangement or a parallel arrangement of all mixers. If a plurality of mixers are used, the series arrangement is preferred.

Suitable mixers are in particular dynamic mixers whose mixing elements contain movable parts and static mixers, ie. mixing elements without moving parts in the interior, which operate in particular according to the inline principle.

Suitable mixers are described, for example, by A. Echte, Handbuch der technischen Polymerchemie, VCH Verlagsgesellschaft Weinheim, page 104 et seq. (1993). These include, for example, stirred kettles. Suitable stirrer types comprise, for example, propeller stirrers, impeller stirrers, disk stirrers, paddle stirrers, anchor stirrers, oblique blade stirrers, crossbeam stirrers, helical ribbon impellers, screw-type stirrers, etc.

Suitable dynamic inline mixer are, for example, the Kratz heat exchangers described in ZFL-Zeitschrift für Lebensmitteltechnologie und -Verfahrenstechnik 33(3) (1982), 139 et seq., comminuting machines operating according to the rotor-stator principle, for example toothed-wheel dispersers, colloid mills, corundum disk mills and high-pressure and ultrasonic homogenizers.

Other suitable dynamic inline mixers are continuous tube mixers.

Suitable static inline mixers are, for example, those described in ZFL-Zeitschrift für Lebensmitteltechnologie und -Verfahrenstechnik 33(3) (1982), 139 et seq., for example Ross-ISG mixers, in which the fluid stream is passed through baffles with holes which divide it into part-streams which are then laterally displaced and combined again in a different order, or static mixers which comprise a plurality of fixed mixing elements of the same type which are installed one behind the other in a tube or a duct and are staggered by 90° (for example Kenics, Sulzer SMV and Sulzer SMX mixers).

Further suitable static inline mixers are shear mixers, such as the jet dispersers described in EP-B-101 007.

Further suitable mixers are apparatuses for inline emulsification, such as membranes, jet mixers and curved tubular apparatuses having an essentialy circular or ellipsoidal cross-section.

A preferably used mixing apparatus comprises at least one inline mixer which is advantageously mounted immediately before the reaction vessel.

Particularly preferably, the mixing apparatus comprises a dynamic mixer and/or a static mixer. If two mixers are used, they are connected in series. A preferably used dynamic mixer is a continuous tube mixer or a toothed-wheel disperser, for example of the Megatron type from Kinematica.

An advantageously used mixing apparatus is a tubular apparatus having a plurality of curves in succession, with alternating direction of curvature. Such apparatuses are described in German Patent Application DE 196 34 450, which is hereby fully incorporated by reference.

The apparatus having an essentially circular or ellipsoidal cross-section possesses a plurality of curves which are preferably directly in succession and have an alternating direction of curvature, the direction of curvature being reversed at the latest when that section of the center of gravity of the tube cross-sectional area flowed through from the beginning of a curve is 200 times the tube diameter, it being possible for the curve to comprise up to three revolutions about the axis of curvature.

In the case of an ellipsoidal cross-section of the apparatus, tube diameter is to be understood as meaning the mean value of the large and small axes.

Curves having an alternating direction of curvature are to be understood here as meaning a sequence of curved tube segments, the next tube segment in each case (section of tube between two successive reversals of curvature) leading in another direction, preferably the direction opposite to that of the preceding one, ie. a change, preferably a reversal, of the direction of curvature takes place with each curved tube segment. This design of the apparatus permits the production of windings having a spatially particularly advantageous, ie. compact, arrangement which is particularly suitable for industrial practice.

The radius of curvature of the curved tube segments is preferably from 0.5 to 100, preferably from 1 to 80, from 2 to 50 or from 2 to 20, times the diameter of the tube cross-sectional area.

The dimensions of the apparatus are in general such that the ratio of length to diameter is from 100:1 to 1,000,000:1, preferably from 1000:1 to 100,000:1 or 50,000:1.

In a preferred embodiment, the apparatus is in the form of an ascending single-layer winding about at least two axes, viewed from the direction of the incoming flow. The axes may make an angle with one another but are preferably essentially parallel. Where the winding is not self-supporting, these axes can preferably be realized by tubes or rods which may be round or angular. The term winding about at least two axes is used here only for illustration. It is not necessary for the axes to be realized in the application, for example in the form of tubes or rods.

If a winding about a plurality of axes preferably arranged in a plane is implemented, a band-like or wall-like design results.

The windings mentioned constitute a spatially particularly advantageous arrangement and permit compact design of the novel apparatus. They can easily be transported, which proves advantageous especially for maintenance work. The number of windings arranged one on top of the other is not subject to any restrictions and depends on the particular requirements.

Aqueous monomer emulsions suitable for the novel process comprise a) at least one ethylenically unsaturated monomer,
b) if required, at least one initiator suitable for initiating aqueous emulsion polymerizations,
c) one or more surfactants and,
d) if required, further additives.

Component a)

Monomers suitable for the novel process are monoesters or diesters of ethylenically unsaturated $C_3$–$C_6$-mono- or dicarboxylic acids with $C_1$–$C_{20}$-alkanols or $C_1$–$C_{20}$-diols, vinyl-$C_1$–$C_{20}$-alkyl esters, vinylaromatic compounds, ethylenically unsaturated nitriles, vinyl halides, vinyl-$C_1$–$C_{20}$-alkyl ethers, $C_2$–$C_8$-mono- and diolefins, monoethylenically unsaturated $C_3$–$C_6$-mono- or dicarboxylic acids, salts thereof or amides thereof and N-mono- or N,N-di-$C_1$–$C_{20}$-alkylamides or hydroxyalkylamides, N-vinyllactams, ethylenically unsaturated alkanesulfonic or arylsulfonic acids and/or salts thereof, and mixtures of different monomers of one type and/or of different types.

Examples of suitable monomers are esters of acrylic acid or methacrylic acid with methanol, ethanol, n-propanol, isopropanol, n-butanol, isobutanol, sec-butanol, tert-butanol, pentanol, hexanol, 2-ethylhexanol, octanol, decanol, dodecanol or stearyl alcohol, vinyl formate, vinyl acetate, vinyl propionate, styrene, α-methylstyrene, acrylonitrile, methacrylonitrile, acrylic acid, methacrylic acid, acrylamide, methacrylamide, vinyl chloride, vinylidene chloride, vinyl ethyl ether, ethylene, propylene, butadiene, isoprene, N-vinylpyrrolidone, vinylsulfonic acid and alkal metal salts thereof, acrylamidopropanesulfonic acid and alkali metal salts thereof, sulfonated styrene and alkali metal salts thereof, acrylic acid, methacrylic acid, maleic acid, fumaric acid, itaconic acid, etc.

Examples of further monomers a), which are generally present in minor amounts, comprise N-alkyl- and N-hydroxyalkylamides of the abovementioned, ethylenically unsaturated carboxylic acids, the diesters of dihydric alcohols with the abovementioned, ethylenically unsaturated monocarboxylic acids, the vinyl or allyl esters of the ethylenically unsaturated carboxylic acids, N,N'-divinyl- or N,N'-diallylurea derivatives or divinylaromatics.

Particularly suitable monomer combinations for the novel process are, for example, n-butylacrylate with vinyl acetate; n-butyl acrylate with styrene; n-butyl acrylate with ethylhexyl acrylate; butadiene with styrene; butadiene with acrylonitrile and/or methacrylonitrile; butadiene and isoprene with acrylonitrile and/or methacrylonitrile; butadiene with acrylic esters; butadiene with methacrylic esters. All monomer combinations stated may furthermore contain small amounts of further monomers, preferably acrylic acid, methacrylic acid, acrylamide and/or methacrylamide.

Component b)

Suitable free radical polymerization initiators are all those which are capable of initiating a free radical aqueous emulsion polymerization. These may be both peroxides, for example alkali metal peroxodisulfates, and azo compounds. Combined systems which are composed of at least one organic reducing agent and at least one peroxide and/or hydroperoxide, eg. tert-butyl hydroperoxide with the sodium salt of hydroxymethanesulfinic acid or hydrogen peroxide with ascorbic acid, are also used. Combined systems which contain a small amount of a metal compound which is soluble in the polymerization medium and whose metallic component may occur in a plurality of valency states, for example ascorbic acid/iron(II) sulfate/hydrogen peroxide, are also used, the sodium salt of hydroxymethanesulfinic acid, sodium sulfite, sodium hydrogen sulfite or sodium bisulfite also frequently being used instead of ascorbic acid and tert-butyl hydroperoxide or alkali metal peroxodisulfates and/or ammonium peroxodisulfate instead of hydrogen peroxide. Preferred initiators are the ammonium or alkali metal salts of peroxosulfates or peroxodisulfates, in particular sodium or potassium peroxodisulfate. The amount of the free radical initiator systems used is preferably from 0.1 to 2% by weight, based on the total amount of the monomers to be polymerized.

Component c)

The emulsion polymerization is carried out in the presence of suitable emulsifiers and protective colloids. These substances are usually used in amounts of up to 10, preferably from 0.5 to 5, in particular from 0.5 to 3, % by weight, based on the monomers to be polymerized.

Suitable protective colloids are, for example, polyvinyl alcohols, cellulose derivatives or copolymers based on vinylpyrrolidone. Suitable emulsifiers are in particular anionic and nonionic emulsifiers, such as ethoxylated mono-, di- and trialkylphenols, ethoxylates of long-chain alkanols, alkali metal and ammonium salts of alkylsulfates, of sulfuric half-esters of ethoxylated alkanols and ethoxylated alkylphenols, of alkanesulfonic acids and of alkylarylsulfonic acids. A detailed description of protective colloids and emulsifiers appears in Houben-Weyl, Methoden der Organischen Chemie, Volume XIV/1, Makromolekulare Stoffe, Georg-Thieme-Verlag, Stuttgart, 1961, pages 192–208 and 411–420.

Nonionic emulsifiers which may be used are araliphatic or aliphatic, nonionic emulsifiers, for example ethoxylated mono-, di- and trialkylphenols (degree of ethoxylation: from 3 to 50, alkyl radical: $C_4$–$C_{10}$), ethoxylates of long-chain alcohols (degree of ethoxylation: from 3 to 50, alkyl radical: $C_8$–$C_{36}$) and polyethylene oxide/polypropylene oxide block copolymers. Ethoxylates of long-chain alkanols (alkyl radicals: $C_{10}$–$C_{22}$, average degree of ethoxylation from 10 to 50) are preferred and among them those having a linear $C_{12}$–$C_{18}$-alkyl radical and an average degree of ethoxylateion of from 10 to 50 and ethoxylated monoalkylphenols are particularly preferred.

Suitable anionic emulsifiers are, for example, alkali metal and ammonium salts of alkylsulfates (alkylradical: $C_8$–$C_{12}$), of sulfuric half-esters of ethoxylated alkanols (degree of ethoxylation: from 2 to 50, alkyl radical: $C_{12}$–$C_{18}$) and of ethoxylated alkylphenols (degree of ethoxylation: from 3 to 50, alkyl radical: $C_4$–$C_9$), of alkanesulfonic acids (alkyl radical: $C_{12}$–$C_{18}$) and of alkylarylsulfonic acids (alkyl radical: $C_9$–$C_{18}$). Further suitable emulsifiers are described in Houben-Weyl, Methoden der organischen Chemie, Volume XIV/1, Makromolekulare Stoffe, Georg-Thieme-Verlag, Stuttgart, 1961, pages 192–208). Other suitable anionic emulsifiers are bis(sulfophenyl) ethers or the alkali metal or ammonium salts thereof which carry a $C_4$–$C_{24}$-alkyl group on one aromatic ring or both aromatic rings. These compounds are generally known, for example from U.S. Pat. No. 4,269,749 and are commercially available, for example as Dowfax® 2A1 (trademark of Dow Chemical Company).

Suitable cationic emulsifiers are preferably quaternary ammonium halides, eg. trimethylcetylammonium chloride, methyltrioctylammonium chloride and benzyltriethylammonium chloride, and quaternary compounds of N-$C_6$–$C_{20}$-alkylpyridines, N-$C_6$–$C_{20}$-alkylmorpholines or N-$C_6$–$C_{20}$-alkylimidazoles, eg. N-laurylpyridinium chloride.

Component d)

Molecular weight can be regulated by using conventional regulators, for example mercapto compounds, such as mercaptoethanol, mercaptopropanol, mercaptobutanol, mercaptoacetic acid, mercaptopropionic acid, mercaptotrimethoxysilane, butyl mercaptan and t-dodecylmercaptan. Organic halogen compounds, such as carbon tetrachloride or bromotrichloromethane, are also suitable. Further suitable additives are, for example, pH adjusters, antioxidants, deodorants, biocides, crosslinking agents, dyes, pigments, etc.

The emulsion prepared according to the invention is polymerized in a reactor suitable for this purpose. Such reactors include, for example, stirred reactors, kettle cascades and unstirred reactors, such as tube reactors. The emulsion polymerization of the continuously prepared monomer emulsions can then be carried out in a semibatch or continuous process.

In a preferred embodiment, the tubular apparatus described above is used not only as a mixing apparatis for the continous preparation of the aqueous monomer emulsion but at the same time as a reactor for the preparation of the polymer dispersion. The components of the monomer emulsion may be fed in at a common point or at different points along the reactor. For example, in the preparation of a copolymer, the comonomer or the comonomers may be fed in together with the main monomer or other components at the beginning or along the curved reactor at various points. The preparation of the emulsion can be carried out in a first section and the polymerization subsequently in an adjacent section. The entire process for the preparation of the polymer dispersions can thus advantageously be carried out continuously.

In a further preferred embodiment, the preparation of the aqueous monomer emulsion is carried out in one of the inline mixers described above and the polymerization subsequently in an adjacent tubular apparatus, as described in DE-196 34 450. The entire process can advantageously therefore also be carried out continuously.

The polymerization using a tubular apparatus can be carried out by one of the two processes described above, with or without the addition of an initiator. If an initiator is used, it can be added at the beginning of the tube reactor or, when an additional inline mixer is used, before the latter, or after a tube section sufficient for producing the monomer emulsion, for example from 10 to 50 m. If no initiator is used, the polymerization may also be initiated thermally, for example by increasing the reactor temperature after a tube section sufficient for producing the monomer emulsion.

If the polymerization is not carried out continuously, for example in one of the tube reactors described above, but as a semibatch process, some of the continuous phase may be initially taken, ie. the reactor is filled proportionately with water and, if required, a surfactant and/or a monomer.

The polymerization can also be carried out using a seed latex which, in the case of a semibatch procedure, can be prepared in the reactor vessel at the beginning of the reaction or can be added as a component to the other components of the monomer emulsion before entry into the mixing apparatus Where a tube reactor is used, the seed latex may be prepared separately or in the first part of the reactor. In the latter case, the monomers to be polymerized are then fed in after formation of the seed.

The novel process is particularly suitable for the preparation of polymer dispersions having a high solids content. This is preferably from 25 to 75, particularly preferably at least 50, especially at least 60, % by weight. The disadvantages known from the prior art, in particular due to partial or complete separation of separately prepared (preemulsified) monomer emulsions, are thus avoided.

The nonrestrictive examples which follow illustrate the invention.

EXAMPLES

In order to demonstrate the advantages of a polymerization with continuous emulsion preparation at the rate of consumption in comparison with the feed of pure monomers or in comparison with the feed of an emulsion prepared separately in a kettle, the following four dispersions were each prepared by the 3 following metering methods:

Metering Method 1 (Comparison)

The separately premixed feeds 1A and 1B were metered via a common feed line—but without prior emulsification—into a stirred kettle (polymerization kettle).

Metering Method 2 (Comparison)

The feeds 1A and 1B were emulsified in a kettle and metered from there into the stirred kettle. The feed 2 was metered into the stirred kettle via a separate feed line.

Metering Method 3 (According to the Invention)

Feeds 1A and 2 were combined in a pipeline section. This mixture of feeds 1A and 2 was then metered into feed 1B. The mixture of feeds 1A, 1B ad 2 was then emulsified with the aid of an inline mixing element (a or b) which was mounted immediately before the stirred kettle in the feed line, and said mixture then passed into the stirred kettle.

The inline mixing elements used were:
a) a static mixer of the type SMX-S, DN 3.2, consisting of 10 mixing elements, from Sulzer Chemtech,
b) a Megatron MT 5000 toothed-wheel disperser from Kinematica.

Dispersion 1

13 kg of water were initially taken in a stirred kettle and heated to 90° C. Thereafter, 5% of feed 1 and 9% of feed 2 were added and prepolymerization was carried out for 5 minutes. The residual amounts of feed 1A and B and feed 2 were then metered in while maintaining the polymerization temperature in the course of 3 hours, each by one of the metering methods described above. Thereafter, postpolymerization was carried out for 1 hour to complete the conversion.

Feed 1:
  A:
    24.94 kg of water
    4.33 kg of emulsifier I
    1.25 kg of acrylic acid
    1.50 kg of 50% strength by weight aqueous solution of acrylamide
  B:
    25.00 kg of n-butyl acrylate
    23.00 kg of vinyl acetate
Feed 2:
  Solution of:
    0.375 kg of sodium peroxodisulfate
    4.98 kg of water
Solids content: 52.0%

Dispersion 2

15 kg of water were initially taken in a stirred kettle and heated to 85° C. Thereafter, 6% of feed 1 and 10% of feed 2 were added and prepolymerization was carried out for 10 minutes. The residual amounts of feeds 1A and B and feed 2 were then metered in while maintaining the polymerization temperature in the course of 3.5 hours, each by one of the metering methods described above. Thereafter, postpolymerization was carried out for 1 hour to complete the conversion.

Feed 1:
  A:
    19.01 kg of water
    2.00 kg of emulsifier II
  B:
    30.00 kg of n-butyl acrylate
    20.00 kg of styrene
Feed 2:
  Solution of:
    0.30 kg of sodium peroxodisulfate
    4.70 kg of water
Solids content: 55.6%

Dispersion 3

4.33 kg of water were initially taken in a stirred kettle and heated to 85° C. Thereafter, 5% of feed 1 and 8% of feed 2 were added and prepolymerization was carried out for 5 minutes. The residual amounts of feed 1A and B and feed 2 were then metered in while maintaining the polymerization temperature in the course of 3.5 hours, each by one of the metering methods described above. Thereafter, postpolymerization was carried out for 1 hour to complete the conversion.

Feed 1:
  A:
    10.25 kg of water
    1.33 kg of emulsifier II
    1.50 kg of emulsifier III
    1.00 kg of acrylic acid
    1.40 kg of 25% strength by weight aqueous solution of sodium hydroxide
  B: 15.00 kg of ethylhexyl acrylate 34.00 kg of n-butyl acrylate
Feed 2:
  Solution of:
    0.35 kg of sodium peroxodisulfate
    5.48 kg of water
Solids content: 68.6%

Dispersion 4

A mixture of 16.7 kg of water and 0.3 kg of itaconic acid was initially taken in a pressure-resistant stirred kettle and heated to 85° C. Thereafter, 4.8% of feed 1 and 9% of feed 2 were added and prepolymerization was carried out for 10 minutes. The residual amounts of feed 1A and B and feed 2 were then metered in while maintaining the polymerization temperature in the course of 4.5 hours, each by one of the metering methods described above. Thereafter, polypolymerization was carried for 1.5 hours to complete the conversion.

Feed 1:
  A:
    19.21 kg of water
    3.00 kg of emulsifier II
    0.69 kg of acrylic acid
    0.40 kg of 25% strength by weight aqueous solution of sodium hydroxide
  B:
    31.00 kg of styrene
    18.00 kg of butadiene
    0.44 kg of tert-dodecylmercaptan
Feed 2:
  Solution of:
    0.35 kg of sodium peroxodisulfate
    5.50 kg of water
Solids: 53.7%

The following emulsifiers were used here:
Emulsifier I: 30% strength by weight aqueous solution of the sulfuric half-ester of ethoxylated isononylphenol, degree of ethoxylation: 25

Emulsifier II: 15% strength by weight aqueous solution of sodium lauryl sulfate

Emulsifier III: 20% strength by weight aqueous solution of ethoxylated isooctylphenol, degree of ethoxylation: 25

After the preparation of the dispersions:

the content of coagulum>50 µm the contamination of the polymerization kettle the increase in the internal kettle temperature after the end of the feed were investigated by the following methods:

Coagulum 1 kg of the corresponding dispersion was filtered through a piece of nylon net of known weight and having a mesh size of 50 µm. The coagulum collected was thoroughly washed with distilled water and dried together with the nylon net at room temperature. The weight of the coagulum collected was determined by reweighing. The amount of coagulum is stated in percent (based on the mass of the dispersion).

Contamination of the Polymerization Kettle

After the dispersion had been discharged from the stirred kettle, the latter was thoroughly washed with water and the contamination of the kettle wall and stirrer was visually assessed and evaluated according to the following criteria:

1 very little contamination of stirrer and/or kettle wall 2 slight contamination of stirrer and/or kettle wall 3 moderate contamination of stirrer and/or kettle wall 4 severe contamination of stirrer and/or kettle wall Temperature Increase After End of Feed For this purpose, the temperature which prevailed in the stirred kettle immediately at the end of the feed was compared with the maximum temperature reached after the end of the feed. The differences ΔT thereby determined are each stated in ° C.

The results of the experiments are summarized in Tables 1 to 4 below.

TABLE 1

Results of the experiments for dispersion 1

| Dispersion 1 | Metering method 1 | Metering method 2 | Metering method 3a) | Metering method 3b) |
|---|---|---|---|---|
| Coagulum | 0.14% | 0.09% | <0.01% | <0.01% |
| ΔT after end of feed | 8° C. | 4° C. | — | — |
| Kettle contamination | 4 | 2 | 1 | 1 |

TABLE 2

Results of the experiments for dispersion 2

| Dispersion 2 | Metering method 1 | Metering method 2 | Metering method 3a) | Metering method 3b) |
|---|---|---|---|---|
| Coagulum | 0.2% | 0.11% | 0.02% | <0.01% |
| ΔT after end of feed | 8° C. | 7° C. | about 1° C. | — |
| Kettle contamination | 3 | 2 | 1 | 1 |

TABLE 3

Results of the experiments for dispersion 3

| Dispersion 3 | Metering method 1 | Metering method 2 | Metering method 3a) | Metering method 3b) |
|---|---|---|---|---|
| Coagulum | 0.15% | 0.1% | 0.02% | 0.01% |
| ΔT after end of feed | 10° C. | 7° C. | 2° C. | — |
| Kettle contamination | 4 | 3 | 2 | 1 |

TABLE 4

Results of the experiments for dispersion 4

| Dispersion 4 | Metering method 1 | Metering method 2 | Metering method 3a | Metering method 3b) |
|---|---|---|---|---|
| Coagulum | 0.12% | 0.08% | <0.01% | <0.01% |
| ΔT after end of feed | 8° C. | 6° C. | — | — |
| Kettle contamination | 3 | 2 | 1 | 1 |

As the results of Tables 1 to 4 show, coagulum formation is reduced, temperature increase after the end of the feed is avoided and kettle contamination is reduced by continuous preparation and addition of monomer emulsion in the preparation of polymer dispersions. The novel process is thus superior to the processes known to date.

We claim:

1. A process for the preparation of a polymer dispersion by free radical polymerization of an aqueous monomer emulsion, wherein the monomer emulsion is prepared continuously at the rate at which it is consumed, and wherein the components of the monomer emulsion are mixed in at least one mixing apparatus to give the emulsion, and further wherein an inline mixer in combination with a static mixer, is used as the mixing apparatus.

2. A process for the preparation of a polymer dispersion by free radical polymerization of an aqueous monomer emulsion, wherein the monomer emulsion is prepared continuously at the rate at which it is consumed, and wherein the components of the monomer emulsion are mixed in at least one mixing apparatus to give the emulsion and further wherein the mixing apparatus used is a curved tubular apparatus which has an essentially circular or ellipsoidal cross-section and comprises a plurality of curves with alternating direction of curvature, a change in the direction of curvature occurring at the latest when that section of the center of gravity of the tube cross-sectional area flowed through from the beginning of a curve is 200 times the tube diameter, and it being possible for a curve to comprise up to three revolutions about the axis of curvature.

3. A process as claimed in claim 2, wherein the curve is formed in such a way that the center of gravity of the tube cross-sectional area describes a semicircle per curve.

4. A process as claimed in any of claim 2, wherein, in the case of an ellipsoidal cross-section, the ratio of semimajor axis to semiminor axis is from 5:1 to 1:1.

5. A process as claimed in claim 2, wherein the apparatus is in the form of a winding about at least 2, essentially parallel axes preferably arranged in a plane.

6. A process as claimed in claim 2, wherein the components of the monomer emulsion are fed in at one point or at different points along the apparatus.

7. A process as claimed in claim 2, wherein the apparatus is used as a mixer and reactor.

8. A process as claimed in claim 2, wherein the mixing apparatus used is a combination of one or more inline mixer(s) and an apparatus as defined in claim 7, this apparatus being simultaneously used as the reactor.

9. A process as claimed in claim 1, wherein said inline mixer is a continuous tube mixer.

10. A process as claimed in claim 1, wherein said inline mixer is a toothed-wheel disperser.

11. A process for the preparation of a polymer dispersion by free radical polymerization of an aqueous monomer emulsion having an aqueous continuous phase, wherein the monomer emulsion is prepared continuously at the rate at which it is consumed.

12. The process as claimed in claim 11, wherein components of the monomer emulsion are mixed in at least one mixing apparatus to give the emulsion.

13. The process as claimed in claim 12, wherein said at least one mixing apparatus is at least one dynamic or static mixer.

14. The process as claimed in claim 13, wherein said mixer is selected from the group consisting of mixing chambers, mixing reactors and in-line mixers.

15. The process as claimed in claim 13, wherein said mixer is selected from the group consisting of stirred kettles, rotor-stator systems, ultrasonic homogenizers, high-pressure homogenizers, continuous tube mixers, jet dispersers, shear gap mixers, heat exchangers and curved tubular flow-through reactors having essentially circular or ellipsoidal cross-section.

16. The process as claimed in claim 15, wherein the mixer is a colloid mill or toothed-wheel disperser.

17. A process as claimed in claim 11, wherein the aqueous monomer emulsion comprises a) at least one ethylenically unsaturated monomer, b) optionally, at least one initiator suitable for initiating aqueous emulsion polymerization, c) one or more surfactants and d) optionally, further additives.

18. A process as claimed in claim 17, wherein the ethylenically unsaturated monomers are selected from the group consisting of esters of ethylenically unsaturated $C_3$–$C_6$-mono- or dicarboxylic acids with $C_1$–$C_{20}$-alkanols, vinyl esters of $C_1$–$C_{20}$-monocarboxylic acids, vinylaromatics, ethylenically unsaturated nitriles, vinyl halides, $C_1$–$C_{20}$-alkyl vinyl ethers, aliphatic hydrocarbons having 2 to 8 carbon atoms and 11 or 2 double bonds, ethylenically unsaturated $C_3$–$C_6$-mono- or dicarboxylic acids and amides thereof, N-vinyllactams, ethylenically unsaturated alkanesulfonic or arylsulfonic acids and mixtures thereof.

19. A process as claimed in claim 17, wherein the monomers are selected from the group consisting of $C_1$–$C_{12}$-alkyl acrylates, $C_1$–$C_{12}$-alkyl methacrylates, vinyl formate, vinyl acetate, vinyl propionate, styrene, α-methylstyrene, acrylonitrile, methacrylonitrile, acrylic acid, methacrylic acid, acrylamide, methacrylamide, vinyl chloride, vinyl ethyl ether, ethylene, propylene, butadiene, isoprene and N-vinylpyrrolidone.

20. The process as claimed in claim 17, wherein the at least one ethylenically unsaturated monomer is selected from the group consisting of alkyl acrylates and alkyl methacrylates.

* * * * *